(12) United States Patent
Bartonek

(10) Patent No.: US 7,026,609 B2
(45) Date of Patent: Apr. 11, 2006

(54) METHOD AND APPARATUS FOR TIME-PHASED CONSTANT IR ENERGY DELTA SOURCE

(75) Inventor: Mark Bartonek, Blue Springs, MO (US)

(73) Assignee: General Electric Company, Schenectady, NY (US)

(*) Notice: Subject to any disclaimer, the term of this patent is extended or adjusted under 35 U.S.C. 154(b) by 212 days.

(21) Appl. No.: 10/605,025

(22) Filed: Sep. 2, 2003

(65) Prior Publication Data

US 2004/0108449 A1    Jun. 10, 2004

Related U.S. Application Data

(63) Continuation-in-part of application No. 10/249,878, filed on May 14, 2003, now Pat. No. 6,881,951.

(60) Provisional application No. 60/426,510, filed on Nov. 15, 2002.

(51) Int. Cl.
  *G01D 18/00* (2006.01)
(52) U.S. Cl. ............... 250/252.1; 250/342; 246/169 A
(58) Field of Classification Search ............... 250/342, 250/252.1, 338.1; 246/169 A
  See application file for complete search history.

(56) References Cited

U.S. PATENT DOCUMENTS

| | | |
|---|---|---|
| 4,928,910 A | 5/1990 | Utterback et al. |
| 4,974,797 A | 12/1990 | Myers et al. |
| 5,060,890 A | 10/1991 | Utterback et al. |
| 5,100,243 A | 3/1992 | Grosskopf et al. |
| 5,149,025 A * | 9/1992 | Utterback et al. ...... 246/169 A |
| 5,331,311 A | 7/1994 | Doctor |
| 5,335,995 A | 8/1994 | Villar |
| 5,446,452 A | 8/1995 | Litton |
| 5,660,470 A | 8/1997 | Mench |
| 2002/0033989 A1 * | 3/2002 | Fisher et al. ................ 359/278 |
| 2002/0178782 A1 * | 12/2002 | Lange et al. ................ 73/23.2 |
| 2003/0230991 A1 * | 12/2003 | Muthu et al. ............... 315/307 |

FOREIGN PATENT DOCUMENTS

DE        19501110 A1 *    7/1996

* cited by examiner

*Primary Examiner*—David Porta
*Assistant Examiner*—Christopher Webb
(74) *Attorney, Agent, or Firm*—Enrique J. Mora; Beusse, Walter, Santa, Mora & Maire, P.A.

(57) ABSTRACT

The present invention comprises apparatus for calibrating a railway infrared hot box or hot wheel detector by delivering a desired radiant energy delta to the hot box detector. The apparatus comprises a solid state radiant energy source adapted to be positioned adjacent to the hot box detector being calibrated for emitting radiant energy along a path toward the hot box detector and a processor to cycle the solid state radiant energy source at a desired frequency and intensity between an on state and an off state to achieve the desired radiant energy delta.

27 Claims, 3 Drawing Sheets

METHOD AND APPARATUS FOR TIME-PHASED CONSTANT IR ENERGY DELTA SOURCE

CROSS REFERENCE TO RELATED APPLICATIONS

This application is a continuation-in-part of U.S. patent application Ser. No. 10/249,878 filed May 14, 2003 now U.S. Pat. No. 6,881,951 which claims priority to U.S. Provisional Patent Application No. 60/426,510 filed Nov. 15, 2002.

BACKGROUND OF INVENTION

The present invention relates to railway hot box detectors; and more specifically, to a railway hot box detector calibration device.

rior art hot box detector calibrators employ a black body heat source and a rotating wheel having an aperture therein. When the heat source, aperture and hot box detector are in alignment, infrared energy is transmitted directly from the hot box detector calibrator to the hot box detector and when the heat source, aperture and hot box detector are not in alignment, the wheel blocks the direct transmission of infrared (IR) energy to the detector. In this manner, an infrared energy difference (delta) is created as the wheel rotates and the wheel either allows energy to pass through the aperture or the wheel blocks the energy source. It is the precision in determining this difference in energy that is critical in calibrating the hot box detector. However, a problem exists in prior art hot box detector calibrators in that most hot box detector calibrators calculate the delta by assuming that the energy transmitted by the wheel is either a constant value or merely sense the temperature of the environment assume the wheel is at the same temperature as the environment. Therefore, the reference value of the infrared energy delta is an assumed rather than sensed value. As such, prior art hot box detector calibrators cannot provide the high level of precision or accuracy in their delta values required for proper calibration.

SUMMARY OF INVENTION

The present invention comprises apparatus for calibrating a railway infrared hot box or hot wheel detector by delivering a desired radiant energy delta to the hot box detector. A first embodiment of the invention comprises apparatus for calibrating a railway infrared hot box or hot wheel detector by delivering a desired radiant energy delta to the hot box detector. The apparatus comprises a source of radiant energy source adapted to be positioned adjacent to the hot box detector being calibrated for emitting radiant energy along a path toward the hot box detector. A shutter device is positioned between the source of radiant energy and the hot box detector along the path. The shutter device is selectively operable between a first mode of operation in which the shutter device permits radiant energy to be transmitted from the source to the hot box detector along the path and a second mode of operation in which the shutter blocks the transmission of radiant energy from the source to the detector. A temperature sensor senses a temperature of the shutter device. A processor responsive to the temperature sensed by the temperature sensor operates the energy source at a desired temperature setpoint based on the temperature of the shutter device and the desired radiant energy delta.

In a second embodiment of the invention, the apparatus comprises a solid state radiant energy source adapted to be positioned adjacent to the hot box detector being calibrated for emitting radiant energy along a path toward the hot box detector and a processor to cycle the solid state radiant energy source at a desired frequency and intensity between an on state and an off state to achieve the desired radiant energy delta.

BRIEF DESCRIPTION OF DRAWINGS

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

A Calibrated Heat Source (CHS) is a device that delivers time phased IR energy impulses for the purposes of calibrating Hot Box Detector (HBD) systems or Hot Wheel Detector (HWD) systems. For the purposes of this application, the term hot box detector and hot wheel detector are used interchangeably. HBDs are normally attached to or near railroad rails and are used to detect overheated conditions in the wheel or bearing of a railroad car. The CHS generally consists of a heated black body that radiates IR energy. In a first embodiment of the invention, the IR energy radiated by the black body is "chopped" by a rotating wheel containing an aperture where the wheel alternately blocks or passes the black body IR energy out of the device. The chopper wheel itself radiates IR energy at a level near the external operating temperature of the device. Prior art calibration devices measure the external operating temperature of the device. An operator calibrating an HBD system with the prior art equipment manually adjusts a heater to vary the black body temperature based upon the observed external operating temperature of the device and the measured temperature of the black body to set the IR power delta to be a predetermined level. Calibration errors arise when the temperature of the wheel is not the same as that of the external operating temperature and in assuming that a constant temperature delta equates to a constant IR energy radiation delta, regardless of the absolute temperature involved. In the present invention, both the temperature of the black body and the temperature of the chopper wheel are directly monitored by the CHS and that data is then used to automatically control the heating of the black body, based on calculations of the level of IR energy radiated. By doing this, the resultant IR energy delta can be kept constant throughout the environmental operating range of the device.

The primary requirement addressed by the CHS is delivery of a time phased constant IR energy delta over a broad range of operating conditions. The time phase of the energy delta is preferably an IR energy cycle of once every 180 to 260 msec, with the IR energy delta equivalent to the energy difference of two black bodies, one at a temperature of 200° F. and the other at a temperature of 70° F., when operating in a temperature range of −40° F. to 120° F.

Figure 1:
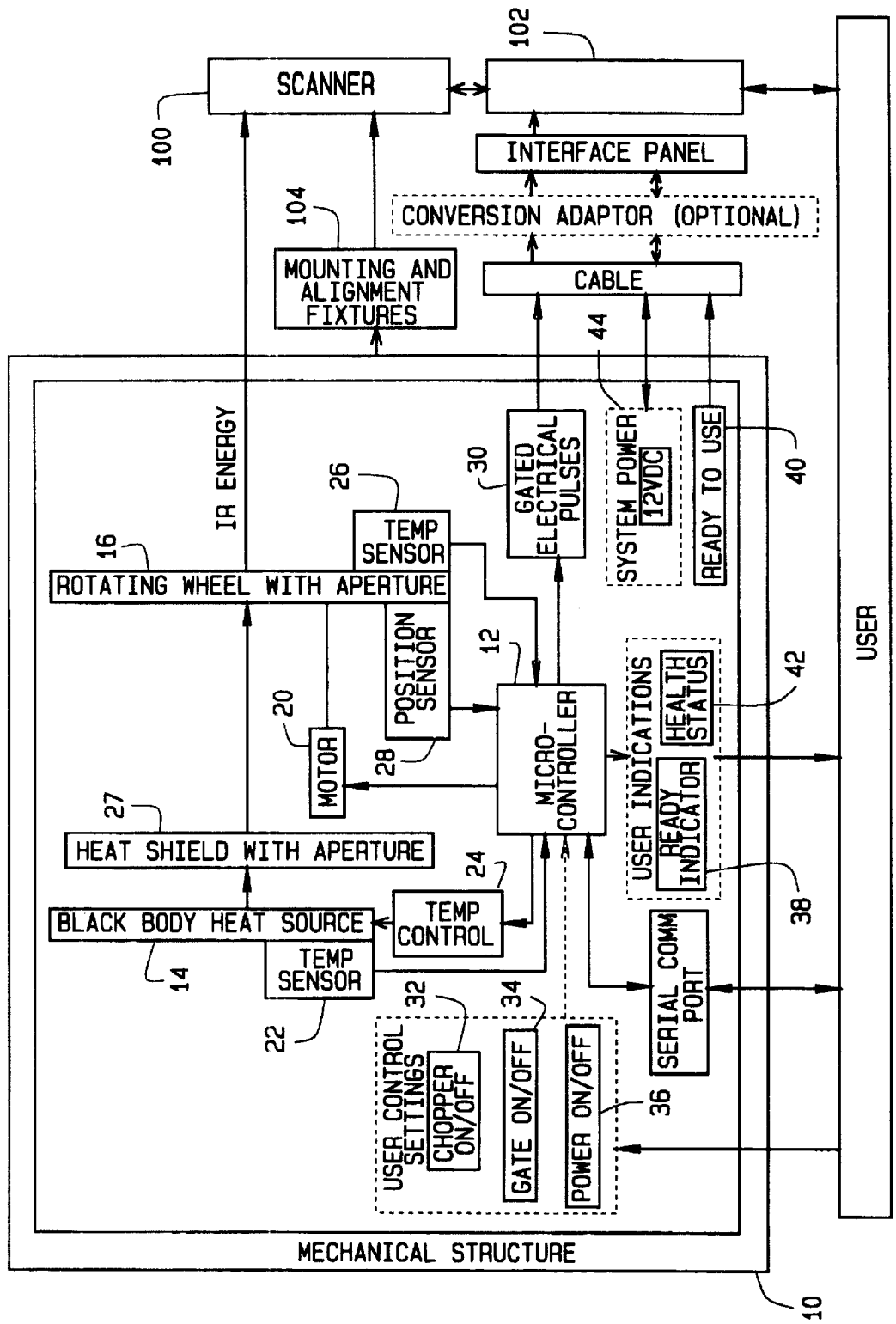
FIG. 1 is a block diagram of a first embodiment of the apparatus of the present invention.

Referring to FIG. 1, there is shown a CHS 10, a scanner 100 and a HBD or HWD 102. CHS 10 comprises a microcontroller 12, a black body heat source 14 and a rotating wheel 16 having an aperture 16a therein. Rotating wheel 16 is operated by a DC electric motor 20 and as the wheel 16 rotates, infrared energy is allowed to pass through wheel 16 when aperture 16a is in alignment with an opening of black body heat source 14 and infrared energy is blocked from passing wheel 16 when the aperture is not in alignment with the opening of black body heat source 14. The motor speed is controlled by an output of microcontroller 12. CHS 10 further comprises a temperature sensor 22 for sensing the temperature of black body heat source 14 and sending a signal representative of the sensed temperature as an input to microcontroller 12. Based upon the temperature sensed, microcontroller 12 causes a temperature controller 24 to increase or decrease power to black body heat source 14. Likewise, rotating wheel 16 is equipped with a temperature sensor 26 for determining the temperature of the rotating wheel 16 and sending a signal representative of the sensed temperature also as an input to microcontroller 12. Based upon the sensed temperature, the temperature of black body heat source 14 is increased or decreased, as discussed below. A heat shield 27 is further disposed between black body heat source 14 and wheel 16 to keep wheel 16 relatively cool.

Rotating wheel 16 is further equipped with a position sensor 28 for determining the angular location of aperture 16a. Based upon an input from position sensor 28 to microcontroller 12, the microcontroller further outputs gated electrical pulses, shown symbolically as numeral 30 as an output of CHS 10. The gated electrical pulses 30 indicate to certain types of HBDs or HWDs 102 when the IR delta is increasing from its reference value to its peak value, and when it is decreasing again back to its reference value. The gated electrical pulses consist of A pulses and B pulses. The A & B pulses can be either positive or negative depending on HBD or HWD systems.

Figure 2:
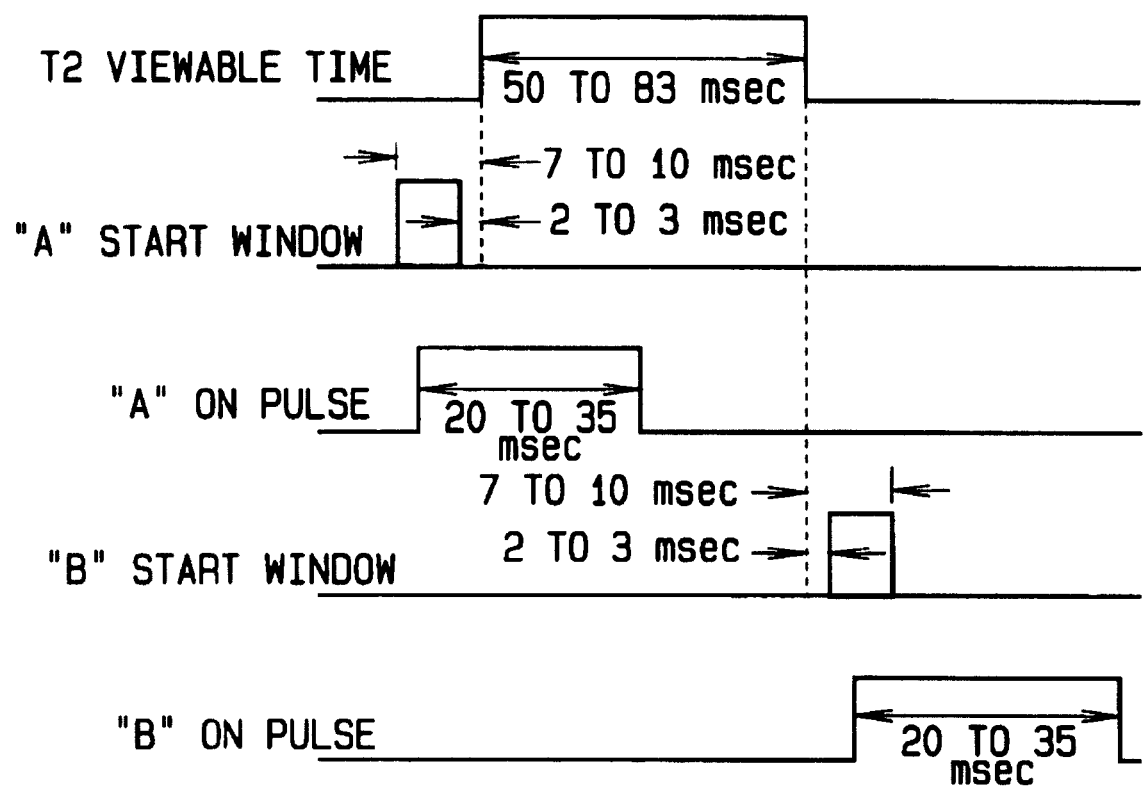
FIG. 2 is a timing chart of gated electrical pulses supplied by the apparatus for coordinating the operation of the apparatus and the sensor being calibrated.

Referring to FIG. 2, the A pulses begin slightly before aperture 16a aligns with the opening of black body heat source 14 and infrared energy passes through the aperture. The A pulse extends for a sufficient period of time to be detected, and may extend into the time which infrared energy is allowed to pass wheel 16. Next, a B pulse begins at a time just after aperture 16a has passed from alignment with black body heat source 14, and the pulse duration is again sufficient for the pulse to be detected. The start window for an A pulse typically begins 7 to 10 msecs before the aperture is in alignment and ends 2 to 3 msecs before the aperture is in alignment, and the pulse lasts 20 to 35 ms. The start window for a B pulse is typically begins 2 to 3 msecs after the aperture is no longer in alignment and ends 7 to 10 seconds after the aperture is in alignment, and the pulse lasts 20 to 35 ms.

Other inputs to the microcontroller 12 include an on/off switch 32 for operating wheel 16, an on/off switch 34 for initiating the gated pulses 30, and an on/off switch 36 for overall power to CHS 10. Other outputs from microcontroller 12 include a "ready to use" indicator 38 to indicate that all portions of the CHS 10 are operating within tolerances and that the appropriate IR delta is obtainable. A ready to use indicator signal 40 may also be passed to HBD or HWD 102 to indicate when calibration may begin. Finally, a "health" status indicator 42 may also be provided to indicate whether CHS 10 is operating properly; for example, is the control of the heat source working properly, or is the control of the wheel 16 working properly.

It is further contemplated that a serial communications port be provided on CHS 10 for communicating with an external computer or other device regarding CHS 10 operation and status, and for providing updated firmware used to operate CHS 10.

An algorithm is employed by microcontroller 12 to determine and maintain the proper temperature of the black body to achieve a desired IR energy delta. This is accomplished using the calculation $P = \sigma \cdot \epsilon (T_{bb}^4 - T_w^4)$, where P equals the desired IR power level, $\sigma$ equals the Stefan-Boltzman constant and $\epsilon$ equals the emissivity of the black body heat source 14, $T_{bb}$ equals the temperature of the black body and $T_w$ equals the temperature of the wheel. Microcontroller 12 is programmed with the desired IR power level, Stefan-Boltzman constant and the emissivity of black body heat source 14. Microcontroller 12 receives the temperature of wheel 16 as an input and solves for the desired temperature of black body heat source 14. When the desired temperature of black body heat source 14 is determined, microcontroller 12 acts to increase or decrease the current temperature of black body heat source 14 to the desired temperature. A typical control algorithm is used such as PID to limit over shoot or oscillation of the black body.

Referring back to FIG. 1, CHS 10 is mounted on one of a variety of mounting fixtures 104 to orient CHS 10 in a required position for the type of scanner 100 being calibrated. The fixture and position differs for each different type of scanner 100 to be calibrated. Furthermore, gated electrical pulse 30, a power input 44 and ready to use output 40 are attached to HBD or HWD 102 in accordance with the prior art to communicate with the HBD or HWD 102.

Figure 3:
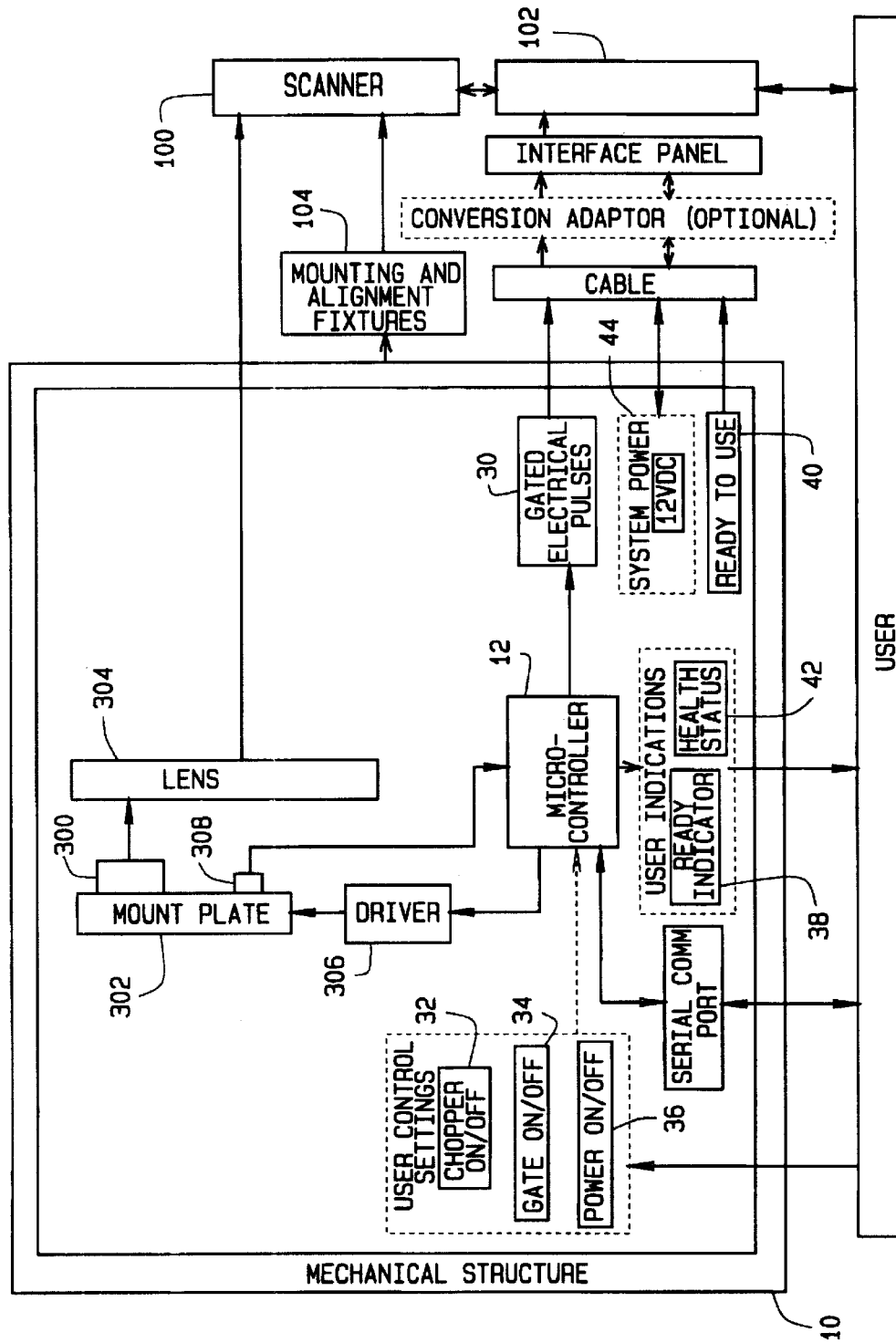
FIG. 3 is a block diagram of a second embodiment of the present invention.

Referring to FIG. 3, an alternative embodiment of the present invention is shown. Previously illustrated reference numerals are not redescribed. The embodiment of FIG. 3 employs a solid state infrared emitter that can be cycled at a desired frequency to simulate the black body heat source and chopper wheel of the previous embodiment. In that regard, there is provided an infrared emitter 300 mounted upon a mount plate 302, transmission lens 304, and emitter driver board 306.

The infrared emitter 300 is a solid state device capable of a large temperature modulation when operated in a pulsed mode of operation and emits light primarily between 2 and 20 μm. The term "solid state" means "of or being an electronic device that can be controlled without the use of moving parts, heated filaments or vacuum gaps." The infrared emitter 300 is preferably a Pulsir NL8LNC Broadband Infrared Source available from Ion Optics, Inc. of Waltham, Mass.

The infrared emitter 300 is mounted to a mount plate 302, preferably made of aluminum, and is driven an emitter driver board 306. The mount plate 302 acts as a heat sink so that the emitter can properly cycle between high and low infrared energy emission states. The emitter driver board 306 is connected to and controlled by the microcontroller 12 and receives power from the power supply 44. A temperature sensor 308 is provided for monitoring the temperature of the mount plate 302. The temperature sensor 308 is connected to and signals the microcontroller 12.

The transmission lens 304 is a germanium coated transmission lens that is preferably located 76 mm from the source in order to properly focus the infrared light upon the HBD or HWD to be calibrated.

In operation, the embodiment of FIG. 3 operates by the microcontroller 12 signaling the emitter driver board 306 to cycle the infrared emitter 300 at the desired frequency. The emitter 300 is driven at a power level appropriate to provide a desired IR delta, as described above. This power level will vary as the temperature of the mount plate 302 increases. The temperature sensor 308 communicates the temperature of the mount plate 302 to microcontroller 12 so that the proper drive power level of the emitter 300 is calculated.

By replacing the black body heat source 14, motor 20 and rotating wheel 16, reliability will be increased by the reduction of constituent parts and by the elimination of moving, mechanical parts, greater resolution and accuracy of calibration will be achieved, and maintenance costs will be reduced. Additionally, it is believe that the unit cost of a CHS constructed with the solid state emitter of FIG. 3 will generate at least a 30% savings over that of FIG. 1.

Alternatively, the emitter 300 can be used in a continuous, unpulsed mode in conjunction with the rotating wheel 16 and motor 20.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for calibrating a railway infrared hot box detector by delivering a desired radiant energy delta to the hot box detector comprising: a radiant energy source adapted to be positioned adjacent to the hot box detector being calibrated for emitting radiant energy along a path toward the hot box detector; a lens located between the hot box detector and the radiant energy source for diffusing the radiant energy from the radiant energy source; and a processor for operating the energy source to achieve the desired radiant energy delta, wherein the processor controls the frequency of cycling the operation of the radiant energy source between the first and second modes to achieve the desired radiant energy delta.

2. The apparatus of claim 1 wherein the radiant energy source is a solid state device that is cycled on and off in order to deliver the desired radiant energy delta.

3. The apparatus of claim 1 further comprising a temperature sensor for signaling the temperature of the radiant source to the processor.

4. The apparatus of claim 1 wherein the radiant energy source is mounted upon a heat sink and the apparatus further comprises a temperature sensor for signaling the temperature of the heat sink to the processor.

5. The apparatus of claim 1 further comprising a radiant energy source driver board that communicates with the processor to provide the appropriate level of power to the radiant energy source.

6. The apparatus of claim 1 wherein the processor outputs electrical pulses to indicate to the hot box detector when the energy delta is increasing from a reference value to a peak value and when the delta is decreasing again to its reference value.

7. Apparatus for calibrating a railway infrared hot box detector by delivering a desired radiant energy delta to the hot box detector comprising: a solid state radiant energy source for emitting radiant energy along a path toward the hot box detector adapted to be positioned adjacent to the hot box detector being calibrated; a shutter device positioned between the source of radiant energy and the hot box detector along the path, with the shutter device being selectively operable between a first mode operation in which the shutter device permits radiant energy to be transmitted from the source to the hot box detector along the path, and a second mode of operation in which the shutter blocks the transmission of radiant energy from the source to the detector; a processor for operating the energy source at a desired temperature setpoint, and wherein the processor is further configured to control at least one of the following: the frequency of cycling of shutter operation between the first and second modes to achieve the desired radiant energy delta, and the relative durations of the first and second modes of shutter operation to achieve the desired radiant energy delta.

8. The apparatus of claim 7 further comprising a temperature sensor for sensing a temperature of the shutter device and communicating the sensed temperature to the processor, the processor using the sensed temperature to calculate the desired temperature setpoint.

9. The apparatus of claim 8 further comprising a second temperature sensor for sensing a temperature of the energy source.

10. The apparatus of claim 7 wherein the shutter device is a wheel having an aperture therein and comprises a motor for rotating the wheel.

11. The apparatus of claim 10 wherein the motor is controlled by the processor.

12. The apparatus of claim 7 wherein a heat shield defining an aperture is mounted along the path and radiant energy is transmitted directly from the source to the hot box detector via the aperture of the heat shield and the shutter device when in its first mode of operation.

13. The apparatus of claim 7 wherein the processor outputs electrical pulses to indicate to the hot box detector when the energy delta is increasing from its reference value to its peak value and when it is decreasing again to its reference value.

14. The apparatus of claim 7 further comprising a lens placed between the hot box detector and the radiant energy source for diffusing the radiant energy from the radiant energy source.

15. A method of calibrating a railway infrared hot box detector by delivering a controlled level of radiant energy to the detector, the method comprising: transmitting radiant energy from a radiant energy source when at a high temperature to the hot box detector for a first period of time; transmitting radiant energy from the radiant energy source when not at a high temperature to the hot box detector for a second period of time; controlling the operation of the radiant energy source so as to emit radiant energy at a desired level in excess of that of the radiant energy transmitted during the second period of time to achieve a desired radiant energy delta for calibrating the hot box detector; sensing a parameter indicative of the temperature of the radiant energy source during the second period of time and, based on said sensed parameter, controlling the temperature of the radiant energy source to achieve the desired radiant energy delta.

16. A method of calibrating a railway infrared hot box detector by delivering a controlled level of radiant energy to the detector, the method comprising: transmitting radiant energy from a radiant energy source when at a high temperature to the hot box detector for a first period of time; transmitting radiant energy from the radiant energy source when not at a high temperature to the hot box detector for a second period of time; controlling the operation of the radiant energy source so as to emit radiant energy at a desired level in excess of that of the radiant energy transmitted during the second period of time to achieve a desired radiant energy delta for calibrating the hot box detector, wherein the radiant energy source is an electrical device and the method further comprises controlling transmission of electrical power to the radiant energy source to achieve the desired radiant energy delta.

17. The method of claim 16 further comprising transmitting data to the hot box detector indicative of a time period when the radiant energy delta is increasing from a reference value to a peak value and a time period when the delta is decreasing to its reference value.

18. A method of calibrating a railway infrared hot box detector by delivering a controlled level of radiant energy to the detector, the method comprising: transmitting radiant energy from a radiant energy source when at a high temperature to the hot box detector for a first period of time; transmitting radiant energy from the radiant energy source when not at a high temperature to the hot box detector for a second period of time; controlling the operation of the radiant energy source so as to emit radiant energy at a desired level in excess of that of the radiant energy transmitted during the second period of time to achieve a desired radiant energy delta for calibrating the hot box detector; and controlling the frequency of cycling between the first and second periods of time to achieve the desired radiant energy delta.

19. A method of calibrating a railway infrared hot box detector by delivering a controlled level of radiant energy to the detector, the method comprising; transmitting radiant energy from a radiant energy source when at a high temperature to the hot box detector for a first period of time; transmitting radiant energy from the radiant energy source when not at a high temperature to the hot box detector for a second period of time; controlling the operation of the radiant energy source so as to emit radiant energy at a desired level in excess of that of the radiant energy transmitted during the second period of time to achieve a desired radiant energy delta for calibrating the hot box detector; and controlling the relative durations of the first and second periods of time to achieve the desired radiant energy delta.

20. A method of calibrating a railway infrared hot box detector by delivering a controlled level of radiant energy to the detector, the method comprising: transmitting radiant energy from a radiant energy source when at a high temperature to the hot box detector for a first period of time; transmitting radiant energy from the radiant energy source when not at a high temperature to the hot box detector for a second period of time; controlling the operation of the radiant energy source so as to emit radiant energy at a desired level in excess of that of the radiant energy transmitted during the second period of time to achieve a desired radiant energy delta for calibrating the hot box detector, or wherein the radiant energy source is mounted on a heat sink and the method further comprises sensing the temperature of the heat sink during the second period of time.

21. Apparatus for calibrating a railway infrared hot box detector by delivering a desired radiant energy delta to the hot box detector comprising: a radiant energy source for generating energy along a path toward the hot box detector adapted to be positioned adjacent to a hot box detector to be calibrated; the radiant energy source being selectively operable between a first mode and a second mode, in the first mode the energy source is heated to a relatively high temperature and generates a high level of radiant energy for transmission to the hot box detector, and in a second mode the energy source is not heated to the relatively high temperature and generates a low level of radiant energy; and a processor for controlling the operation of the radiant energy source so as to generate a desired radiant energy delta between said first and second modes of the radiant energy source for calibrating the hot box detector, wherein the processor controls power delivered to the radiant energy source in its first mode so as to achieve the desired radiant energy delta.

22. The apparatus of claim 21 wherein the radiant energy source is a solid state device and in the first mode utilizes electrical power for heating the device.

23. The apparatus of claim 21 further comprising a temperature sensor for generating data indicative of the temperature of the radiant source to be transmitted to the processor.

24. The apparatus of claim 21 wherein the radiant energy source is mounted upon a heat sink and the apparatus further comprises a temperature sensor for signaling the temperature of the heat sink to the processor.

25. The apparatus of claim 21 further comprising a radiant energy source driver board that communicates with the processor to provide the appropriate level of power to the radiant energy source.

26. The apparatus of claim 21 wherein the processor outputs data to indicate to the hot box detector the time period when the radiant energy delta from the source is increasing from a reference value to a peak value and the time period when the radiant energy delta is decreasing from its peak value to its reference value.

27. Apparatus for calibrating a railway infrared hot box detector delivering a desired radiant energy delta to the hot box detector comprising: a radiant energy source adapted to be positioned adjacent to the hot box detector being calibrated for emitting radiant energy along a path toward the hot box detector; a lens located between the hot box detector and the radiant energy source for diffusing the radiant energy from the radiant energy source; and a processor for operating the energy source to achieve the desired radiant energy delta, wherein the processor controls the relative durations of the first and second modes to achieve the desired radiant energy delta.

* * * * *